United States Patent
Li et al.

(10) Patent No.: US 12,058,297 B2
(45) Date of Patent: Aug. 6, 2024

(54) METHOD AND SYSTEM FOR HIDING REVERSIBLE DATA BASED ON PREDICTION ERRORS

(71) Applicant: JILIN UNIVERSITY, Jilin (CN)

(72) Inventors: Hongtu Li, Jilin (CN); Shuai Li, Jilin (CN); Liang Hu, Jilin (CN); Chengyu Sun, Jilin (CN); Ling Chi, Jilin (CN); Tuohang Li, Jilin (CN)

(73) Assignee: JILIN UNIVERSITY, Jilin (CN)

( * ) Notice: Subject to any disclaimer, the term of this patent is extended or adjusted under 35 U.S.C. 154(b) by 377 days.

(21) Appl. No.: 17/629,615

(22) PCT Filed: Jan. 14, 2021

(86) PCT No.: PCT/CN2021/071769
§ 371 (c)(1),
(2) Date: Jan. 24, 2022

(87) PCT Pub. No.: WO2022/088516
PCT Pub. Date: May 5, 2022

(65) Prior Publication Data
US 2022/0368808 A1 Nov. 17, 2022

(30) Foreign Application Priority Data

Oct. 26, 2020 (CN) .......................... 202011154309.8

(51) Int. Cl.
H04N 1/32 (2006.01)
G06F 21/60 (2013.01)

(52) U.S. Cl.
CPC ....... *H04N 1/32347* (2013.01); *G06F 21/602* (2013.01); *H04N 1/32229* (2013.01); *H04N 1/32272* (2013.01); *H04N 1/32277* (2013.01); *H04N 1/32299* (2013.01)

(58) Field of Classification Search
None
See application file for complete search history.

(56) References Cited

FOREIGN PATENT DOCUMENTS

| CN | 105741225 A | * | 7/2016 | |
|----|-------------|---|--------|---|
| CN | 107087086 A | * | 8/2017 | |
| CN | 109348228 A | * | 2/2019 | ......... H04N 1/32272 |
| CN | 114466112 A | * | 5/2022 | |

(Continued)

OTHER PUBLICATIONS

Li et al, "A Reversible Data Hiding Algorithm Based on Prediction Error With Large Amounts of Data Hiding in Spatial Domain", IEEE Access, Nov. 24, 2020 (Year: 2020).*

*Primary Examiner* — Scott A Rogers
(74) *Attorney, Agent, or Firm* — RAY QUINNEY & NEBEKER P.C.; Paul N. Taylor (57) ABSTRACT

A method and system for hiding reversible data based on prediction errors are provided, where the method includes: partitioning an image, to obtain a shadow part and a blank part; performing a first-layer embedding process on the shadow part; performing a multi-layer embedding process on the blank part; extracting outermost layer information of the blank part after the multilayer embedding process; and extracting information of the shadow part after the first-layer embedding process. According to the method in the present disclosure, a problem of image distortion during high-capacity data embedding can be effectively solved.

10 Claims, 3 Drawing Sheets

(56) References Cited

FOREIGN PATENT DOCUMENTS

| CN | 114466113 A | * | 5/2022 |
| CN | 114565499 A | * | 5/2022 |
| CN | 115134474 A | * | 9/2022 |

* cited by examiner

METHOD AND SYSTEM FOR HIDING REVERSIBLE DATA BASED ON PREDICTION ERRORS

CROSS REFERENCE TO RELATED APPLICATIONS

This application a national stage of International Application No. PCT/CN2021/071769, filed on Jan. 14, 2021, which claims priority to Chinese Patent Application No. 202011154309.8, filed with the China National Intellectual Property Administration (CNIPA) on Oct. 26, 2020, and entitled "METHOD AND SYSTEM FOR HIDING REVERSIBLE DATA BASED ON PREDICTION ERRORS". Both of the aforementioned application are incorporated herein by reference in their entireties.

TECHNICAL FIELD

The present disclosure relates to the fields of image encrypting, and in particular, to a method and system for hiding reversible data based on prediction errors.

BACKGROUND ART

With the development of Internet technology, information security-related problems are caused in an information transmission process. Steganography is a skill and a science related to information hiding, that is, anyone other than planned receivers cannot know about transmission events of the information (not just content of the information). According to a method for hiding reversible data, data is hidden into digital images secretly, and an original image can be restored completely after the embedded data is extracted. The reversible data hiding is applied to multiple application scenarios due to a reversible characteristic, and is an ideal choice for scenarios such as military confidential, legal authentication, and remote medical treatment with a relatively high requirement on fidelity. In the method for hiding reversible data, a method based on prediction errors has better performance.

Certainly, an existing technology for hiding reversible data based on prediction errors also has many defects. At present, the current reversible data hiding algorithm has following defects: (1) A relatively large embedding capacity, which increases image distortion. (2) The algorithm is complex, and time complexity is high. (3) Security of the hiding algorithm is low.

SUMMARY

Based on this, an object of the present disclosure is to provide a method and system for hiding reversible data based on prediction errors, which can effectively solve a problem of image distortion during high-capacity data embedding.

To achieve the object, the present disclosure provides a method for hiding reversible data based on prediction errors, including:

partitioning an image, to obtain a shadow part and a blank part;

performing a first-layer embedding process on the shadow part;

performing a multi-layer embedding process on the blank part;

extracting outermost layer information of the blank part after the multilayer embedding process; and extracting information of the shadow part after the first-layer embedding process.

In some embodiments, the partitioning an image specifically includes:

scanning the image from left to right and from top to bottom, to obtain an original pixel sequence $\{c_1, c_2, \ldots, c_n\}$ of the image; and partitioning the original pixel sequence, to obtain the blank part $\{a_1, a_2, \ldots, a_n\}$ and the shadow part $\{x_1, x_2, \ldots, x_n\}$.

In some embodiments, the performing first-layer embedding process on the shadow part specifically includes:

predicting center pixels by using peripheral pixels of the shadow part, to obtain first-layer encrypted predicted value, where a first row, a first column, a last row, and a last column of pixels of the shadow part are not predicted; and the following equation is specifically adopted:

$$\hat{x}1 = \text{floor}\left[\frac{a1+a2+a3+a6+a7+a9+a10+a11}{8}\right] \quad (1)$$

$$\hat{x}2 = \text{floor}\left[\frac{a3+a4+a5+a7+a8+a11+a12+a13}{8}\right]$$

$$\vdots$$

$$\hat{x}n(i,j) = \text{floor}\left[\frac{a(i-1,j-1)+a(i-1,j)+a(i-1,j+1)+a(i,j-1)+a(i,j+1)+a(i+1,j-1)+a(i+1,j)+a(i+1,j+1)}{8}\right]$$

where equation (1) represents that the center pixels are predicted by using the peripheral pixels, i, j, respectively represent a row and a column where a current pixel is located, $\{a1, a2, \ldots, an\}$ are all original pixel values in the first-layer embedding process, $\{\hat{x}1, \hat{x}2, \hat{x}3, \ldots, \hat{x}n\}$ is a one-dimensional predicted value sequence, and predicted values are integers;

calculating difference between an original pixel value of the current pixel and corresponding first-layer encrypted predicted value, to obtain a first prediction error value sequence (e1, ..., en), where the following equation is specifically adopted:

$$ei = Xi - \hat{x}i \quad (2)$$

where Xi represents the original pixel value of the current pixel, and $\hat{x}i$ represents corresponding first-layer encrypted predicted value;

calculating a frequency of each value in the first prediction error value sequence, to generate a first prediction error histogram;

obtaining additional information, which includes a length of secret information and a size of a compressed location map;

embedding the additional information in a first row of original image pixels;

embedding the secret information b∈ {0,1} in a predetermined prediction error value range, to obtain expanded and offset prediction error values; and determining a first-layer encrypted image based on the expanded and offset prediction error values, where the following equation is adopted:

$$X'_i = \hat{x}_i + e'i \quad (4),$$

where $X'_i$ represents a pixel value of the first-layer encrypted image, $\hat{x}_i$ represents a predicted value of a pixel of the shadow part, and e'i represents an expanded and offset prediction error.

In some embodiments, the embedding the additional information in a first row of original image pixels specifically includes:

adjusting a boundary pixel value of the shadow part, where the boundary pixel value is [0, 255];

modifying location map marks corresponding to modified pixels to be 1, and location map marks corresponding to remaining unmodified pixel values to be 0, to obtain a location map matrix formed by 0 and 1;

compressing the location map matrix to obtain a compressed location map; and embedding the compressed location map in the first row of the original image pixels.

In some embodiments, the embedding the secret information b∈ {0,1} in a preset prediction error value range, to obtain expanded and offset prediction error values specifically adopts the following equation:

$$e'i = \begin{cases} 2ei + b, & if\, ei \in [-T, T) \\ ei + T, & if\, ei \in [T, +\infty) \\ ei - T, & if\, ei \in [-\infty, -T) \end{cases} \quad (3)$$

where b represents the secret information, ei represents a prediction error, T represents an prediction error range by which the secret information is embedded, and e'i represents the expanded and offset prediction error.

In some embodiments, the performing multi-layer embedding process on the blank part specifically includes:

predicting pixels of the blank part with neighbor pixels as centers by using first-layer encrypted pixels, to obtain second-layer of encrypted predicted value;

calculating a difference between an original pixel value of a current pixel and corresponding second-layer encrypted predicted value, to obtain a second prediction error value sequence;

calculating a frequency of each value in the second prediction error value sequence, to generate a second prediction error histogram; and performing data embedding and translation according to the second prediction error histogram, to obtain a final encrypted image.

In some embodiments, the extracting outermost layer information of the blank part after the multilayer embedding process specifically includes:

extracting additional information embedded in a first row;

obtaining second-layer encrypted predicted value of pixels of an encrypted image;

obtaining a second prediction error value sequence based on the second-layer encrypted predicted value, and generating a second prediction error histogram;

extracting secret information according to the second prediction error value sequence; and restoring pixel values of an outermost encrypted image.

In some embodiments, the extracting information of the shadow part after the first-layer embedding process specifically includes:

obtaining an encrypted image during first-layer encryption;

obtaining first-layer encrypted predicted value of the encrypted image during the first-layer encryption;

obtaining a first prediction error value sequence based on the first-layer encrypted predicted value, and generating a first prediction error histogram;

extracting secret information based on the first prediction error value sequence; decompressing a losslessly compressed location map to obtain a decompressed location map; and obtaining, according to the decompressed location map, pixels corresponding to location map marks of 1, modifying and restoring the pixels, to restore original pixel values, and obtaining a non-destructive restored original image.

In some embodiments, the extracting secret information based on the second prediction error value sequence specifically includes:

extracting the secret information within [−2, 1) according to T=1, dw(i, j);

according to formulas:

$$S = \mathrm{mod}(dw(i,j)+1, 2) \quad (5); \text{ and}$$

$$Pr(i,j) = (P's(i,j)) + (dw(i,j) - S)/2 \quad (6),$$

where S is an extracted secret information bit, Pr is a restored pixel value, P's is a predicted value of an encrypted image, and dw is a prediction error value of the encrypted image; and the remaining pixels are expanded and translated pixels in a range of [1, +∞) and (−∞, −2), and no information is embedded, and an extraction method is performed according to the following formula:

$$\begin{cases} Pr(i, j) = P's(i, j) + dw(i, j) - T & \text{if } dw(i, j) \in [1, +\infty) \\ Pr(i, j) = P's(i, j) + dw(i, j) + T & \text{if } dw(i, j) \in (-\infty, -2) \end{cases} \quad (7)$$

until all the secret information of the blank part is extracted completely.

The present disclosure further provides a system for hiding reversible data based on prediction errors, including:

an image partitioning module, configured to partition an image, to obtain a shadow part and a blank part;

a first-layer embedding process module, configured to perform first-layer embedding process on the shadow part;

a multi-layer embedding process module, configured to perform multi-layer embedding process on the blank part;

a first extraction module, configured to extract outermost layer information of the blank part after the multilayer embedding process; and a second extraction module, configured to extract information of the shadow part after the first-layer embedding process.

According to specific embodiments provided in the present disclosure, the present disclosure provides following technical effects:

(1) According to the method of the present disclosure, image distortion can be reduced while a large amount of data is embedded, and a conflict relationship between an embedded capacity and image distortion is well solved.

(2) According to the present disclosure, time complexity of an algorithm is low.

(3) According to the present disclosure, security of the algorithm is high.

BRIEFT DESCRIPTION OF THE DRAWINGS

In order to describe the technical solution of the invention more clearly, accompanying drawings required in the embodiments of the present disclosure will be illustrated briefly below. Apparently, the accompanying drawings in the following description merely illustrate some embodiments of the present disclosure, and those ordinarily skilled in the art may also derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other examples obtained by a person of ordinary skills in the art based on the examples of the present disclosure without creative efforts shall fall within the protection scope of the present disclosure.

An object of the present disclosure is to provide a method and system for hiding reversible data based on prediction errors, which can effectively solve a problem of image distortion during high-capacity data embedding.

To make the above-mentioned objects, features, and advantages of the present disclosure clearer and more comprehensible, the present disclosure will be further described in detail below with reference to the accompanying drawings and specific implementations.

Figure 1:
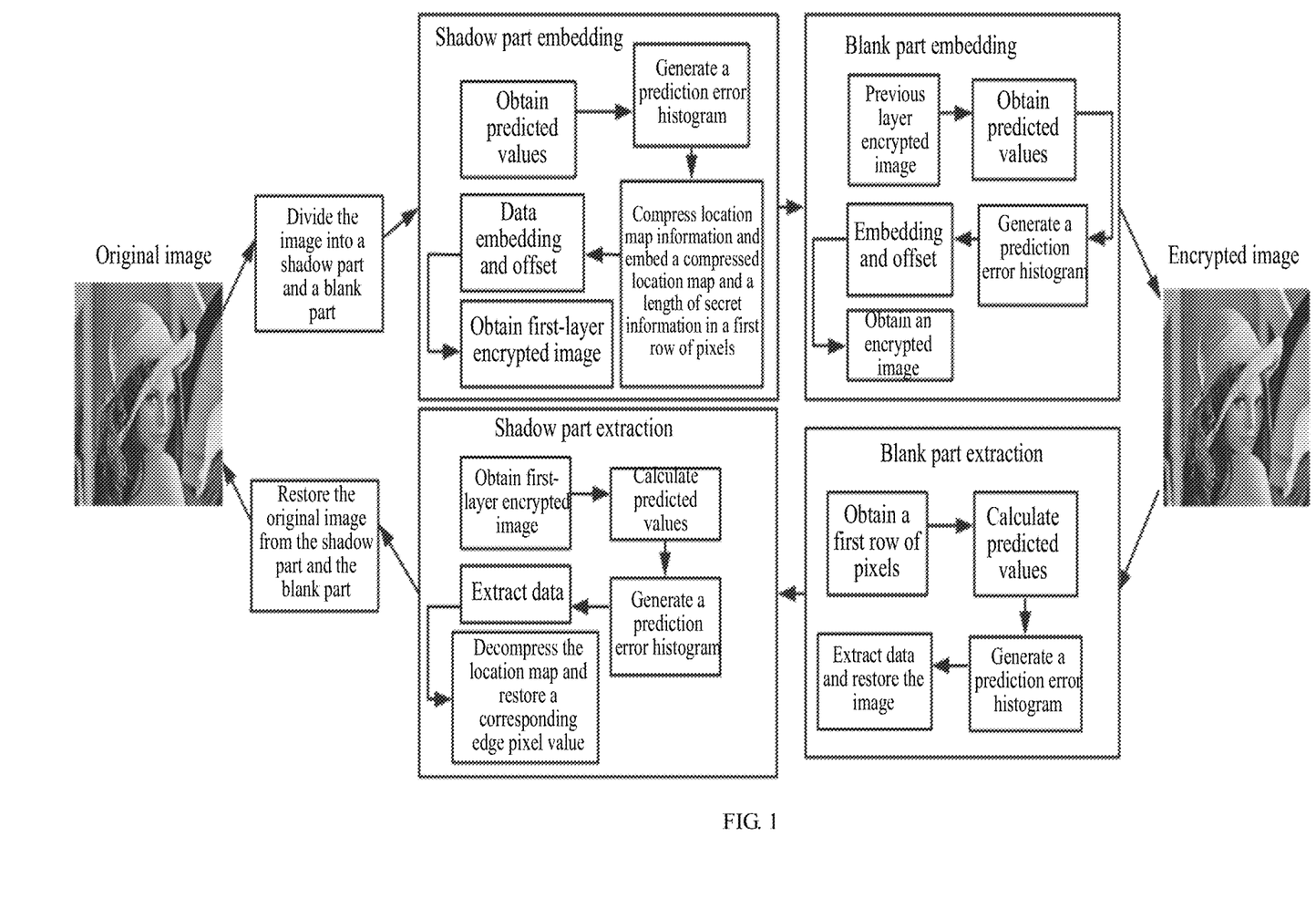
FIG. 1 is a flowchart of a method for hiding reversible data based on prediction errors according to an embodiment of the present disclosure.

FIG. 1 is a flowchart of a method for hiding reversible data based on prediction errors according to an embodiment of the present disclosure. As shown in FIG. 1, the method includes the following steps.

In step 101, an image is partitioned, to obtain a shadow part and a blank part.

A current image is partitioned into two regions, namely a shadow part and a blank part, and first-layer embedding process is first performed on pixels in the shadow part. Subsequently, multi-layer embedding process is performed on pixels in the blank part.

The image partition specifically includes:

scanning the image from left to right and from top to bottom, to obtain an original pixel sequence $\{c_1, c_2, \ldots, c_n\}$ of the image; and partitioning the original pixel sequence, to obtain the blank part $\{a_1, a_2, \ldots, a_n\}$ and the shadow part $\{x_1, x_2, \ldots, x_n\}$.

In step 102, first-layer embedding process is performed on the shadow part.

The performing first-layer embedding process on the shadow part specifically includes the following steps.

Figure 2A:
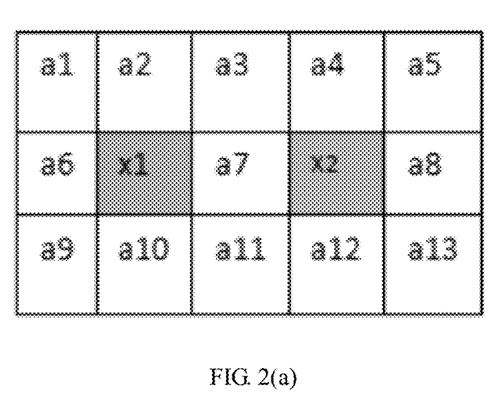
FIG. 2(a) is an original pixel value according to an embodiment of the present disclosure.
Figure 2B:
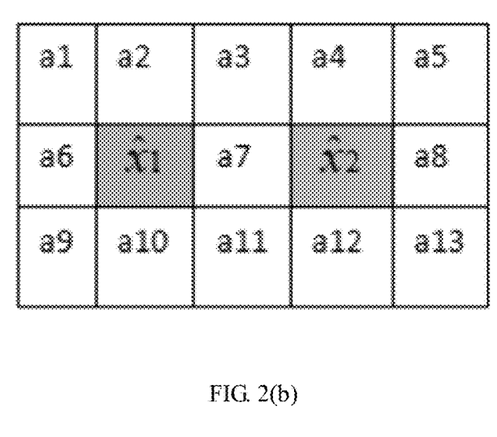
FIG. 2(b) is a predicted pixel value according to an embodiment of the present disclosure.

In S1, center pixels are predicted by using peripheral pixels of the shadow part, to obtain first-layer encrypted predicted value. As shown in FIGS. 2(a) and 2(b), a first row, a first column, a last row, and a last column of pixels of the shadow part are not predicted. Therefore, all prediction error values of the first row, the first column, the last row, and the last column are 0.

Specifically, the following equation is adopted:

$$\hat{x}1 = \text{floor}\left[\frac{a1 + a2 + a3 + a6 + a7 + a9 + a10 + a11}{8}\right] \quad (1)$$

$$\hat{x}2 = \text{floor}\left[\frac{a3 + a4 + a5 + a7 + a8 + a11 + a12 + a13}{8}\right]$$

$$\vdots$$

$$\hat{x}n(i, j) = \text{floor}\left[\frac{a(i-1, j-1) + a(i-1, j) + a(i-1, j+1) + a(i, j-1) + a(i, j+1) + a(i+1, j-1) + a(i+1, j) + a(i+1, j+1)}{8}\right]$$

where equation (1) represents that the center pixels are predicted by using the peripheral pixels, i, j respectively represent a row and a column where a current pixel is located, $\{a1, a2, \ldots, an\}$ are all original pixel values in the first-layer embedding, $\{\hat{x}1, \hat{x}2, \hat{x}3, \ldots, \hat{x}n\}$ is a one-dimensional predicted value sequence, and predicted values are integers.

In S2, a difference between an original pixel value of the current pixel and a corresponding first-layer encrypted predicted value is calculated, to obtain a first prediction error value sequence (e1, ..., en), where the following equation is specifically adopted:

$$ei = Xi - \hat{x}i \quad (2),$$

where Xi represents the original pixel value of the current pixel, and $\hat{x}i$ represents the first-layer encrypted predicted value.

Figure 3:
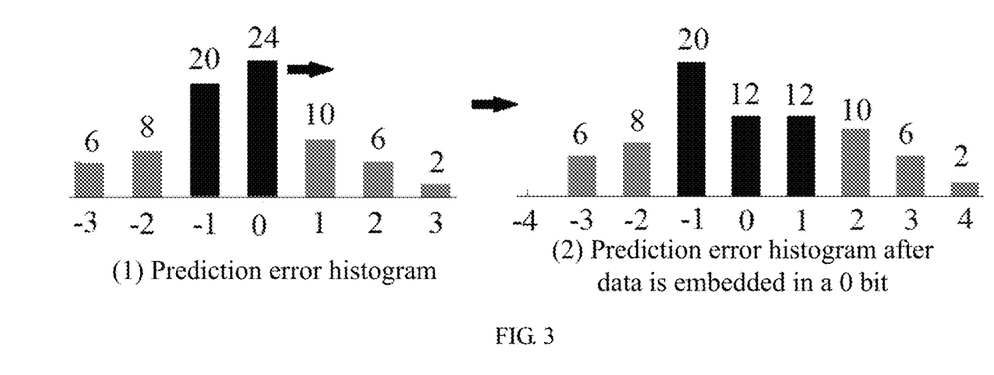
FIG. 3 is a schematic diagram of a moving process of a prediction error histogram according to an embodiment of the present disclosure.

In S3, a frequency of each value in the first prediction error value sequence is calculated, to generate a first prediction error histogram. Embedded data is expanded and translated by modifying the first prediction error histogram, as shown in FIG. 3.

In S4, additional information is obtained, where the additional information includes a length of secret information and a size of a compressed location map.

Figure 4:
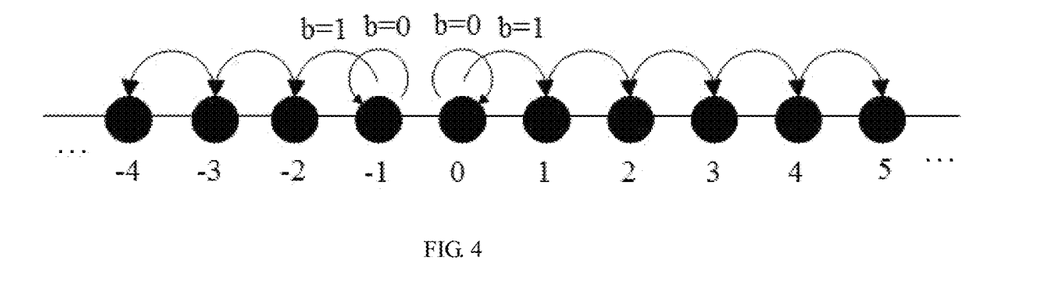
FIG. 4 is a schematic diagram of an embedding process according to an embodiment of the present disclosure.

In S5, the additional information is embedded in a first row of original image pixels, as shown in FIG. 4.

In the method, the additional information is finally embedded in the first row by using a least significant bit replacement technology, and information in the first row is first extracted during extraction. Therefore, information of the compressed location map and the length of the secret information, as parts of an effective capacity, are embedded in the first row of the original image pixels.

A process of embedding the additional information in a first row of original image pixels specifically includes the following steps.

In S51, a boundary pixel value of the shadow part is adjusted, where the boundary pixel value is [0, 255].

In S52, location map marks corresponding to modified pixels are modified to be 1, and location map marks corresponding to remaining unmodified pixel values are set to be 0, to obtain a location map matrix formed by 0 and 1.

The location map is configured to mark pixels that may cause an overflow problem during embedding. To prevent overflow and underflow of a grayscale image in which information has been embedded, that is, to prevent the grayscale image from exceeding a range of [0, 255], pixel values are adjusted within a reliable range. Therefore, in the method, each pixel value is modified by at most 1, and only a boundary value pixel needs to be adjusted. For example, an xi (an original pixel) with a value of 255 is modified as 254, and an xi (an original pixel) with a value of 0 is modified as 1. In addition, location map marks corresponding to modified pixels are modified to be 1, and location map marks corresponding to the remaining unmodified pixel values are set to be 0. Herein, a matrix (that is, a location map matrix) formed by 0 and 1 and having the same size as a given image is obtained, and then, the obtained matrix is compressed by using a lossless compression technology. The lossless compression adopts a digital encoding manner, that is, step S53.

In S53, the location map matrix is compressed to obtain a compressed location map.

In S54, the compressed location map is embedded in the first row of the original image pixels.

b∈{0,1} is embedded in a prediction error [0, −1], to obtain expanded and offset prediction error values e'i.

Specifically, the following equation is adopted:

$$e'i = \begin{cases} 2ei + b, & \text{if } ei \in [-T, T) \\ ei + T, & \text{if } ei \in [T, +\infty) \\ ei - T, & \text{if } ei \in [-\infty, -T) \end{cases} \quad (3)$$

where b represents the secret information, ei represents a prediction error, T represents an prediction error range by which the secret information is embedded, and e'i represents the expanded and offset prediction error.

In S7, a first layer encrypted image is determined based on the expanded and offset prediction error values.

Specifically, following formula is adopted:

$$X'_i = \hat{x}_i + e'i \quad (4),$$

where $X'_i$ represents a pixel value of the first layer encrypted image, that is, the pixel value of the first layer encrypted image, $\hat{x}_i$ represents a predicted value of a pixel of the shadow part, and e'i represents an expanded and offset prediction error.

Similarly, in the solution, multi-layer embedding may be performed, that is, as shown in FIG. 2(a), except for a peripheral part of the original image, the remaining image is divided into a shadow part and a blank part, first-layer embedding is performed on the shadow part, and multi-layer embedding may be performed on the remaining blank part. For example, during second-layer embedding, adjacent pixels of shadow pixels, which are positioned on a right side of the shadow pixels in the same row, are selected for embedding, values used for predicting a second layer during embedding are values modified during first-layer embedding. The remaining process are the same as that of the first-layer embedding. It is noted that it is better to divide secret information into two parts that have similar sizes, after the first-layer embedding is completed, through pixels after first-layer encryption, prediction is performed with neighboring pixels as centers by using the same predictor, and then similar data embedding and offset are performed, until information embedding is completed.

In step 103, multi-layer embedding process is performed on the blank part.

Different from the shadow part, pixel value prediction of the blank part is performed according to pixel values of a previous layer encrypted image. After the first-layer embedding is completed, through pixels after first-layer encryption, a prediction is performed by using the same prediction method and equation (1) with neighboring pixels as centers.

During second-layer embedding, adjacent blank pixels of the shadow pixels, which are positioned on the right side of the shadow pixels in the same row, are selected for embedding, and during embedding, values used for predicting a second layer are values modified during the first-layer embedding.

If two-layer embedding is performed, it is better to divide the secret information into two parts that have similar sizes, and then data embedding and offset are performed correspondingly, until information embedding is completed.

The performing multi-layer embedding process on the blank part specifically includes the following steps.

In A1, pixels of the blank part are predicted with neighbor pixels as centers by using first-layer encrypted pixels, to obtain second-layer encrypted predicted value.

In A2, a difference between an original pixel value of a current pixel and corresponding second-layer encrypted predicted value is calculated, to obtain a second prediction error value sequence.

In A3, a frequency of each value in the second prediction error value sequence is calculated, to generate a second prediction error histogram, as shown in FIG. 3.

In A4, data embedding and translation are performed according to the second prediction error histogram, to obtain a final encrypted image.

In Step 104, outermost layer information of the blank part after the multi-layer embedding process is extracted.

In processes of extracting the secret information and restoring the original image, the secret information embedded in the outermost layer is first extracted, subsequently, extraction is performed toward an inner layer in sequence, and finally the original image is restored in a lossless way and the embedded secret information is obtained.

The extracting outermost layer information of the blank part after the multi-layer embedding process specifically includes the following steps.

In B1, additional information embedded in a first row is extracted.

Original pixel values in the first row are restored. An actual effective capacity in the image is obtained by reading a least significant bit in the first row of the encrypted image. The replaced least significant bit in the first row is restored back to original values of a first row of pixels.

In B2, second-layer encrypted predicted value of pixels of an encrypted image are obtained.

In B3, a second prediction error value sequence based on the second-layer encrypted predicted value is obtained, and a second prediction error histogram is generated.

Specifically, pixel predicted values of an encrypted image are obtained by using the same scanning and prediction command, a marked prediction error sequence of the encrypted image is obtained subsequently, and a prediction error histogram of the encrypted image is generated. This process is the same as that in the embedding stage.

In B4, secret information is extracted according to the second prediction error value sequence.

The secret information is extracted within [−2, 1) according to T=1, dw(i, j), and according to equations:

$$S = \mod(dw(i,j)+1, 2) \quad (5); \text{ and}$$

$$Pr(i,j) = (P's(i,j)) + (dw(i,j) - S)/2 \quad (6),$$

where S is an extracted secret information bit, Pr is a restored pixel value, P's is a predicted value of an encrypted image, and dw is a prediction error value of the encrypted image.

The remaining pixels are expanded and translated pixels in a range of [1, +∞) and (−∞, −2), and no information is embedded, and an extraction method is performed according to following equation:

$$\begin{cases} Pr(i, j) = P's(i, j) + dw(i, j) - T & \text{if } dw(i, j) \in [1, +\infty) \\ Pr(i, j) = P's(i, j) + dw(i, j) + T & \text{if } dw(i, j) \in (-\infty, -2) \end{cases} \quad (7)$$

until all the secret information of the blank part is extracted completely.

In B5, pixel values of an outermost encrypted image are restored.

According to the process, an outermost image and encrypted information can be restored in a lossless way. A first row of pixels, a first column of pixels, a last row of pixels, and a last column of pixels of the original image and a first row of pixels, a first column of pixels, a last row of pixels, and a last column of pixels of the encrypted image are not changed in the embedding and extraction processes, and the predicted values of the encrypted image are the same as that during embedding.

In step 105, information of the shadow part after the first-layer embedding process is extracted.

In C1, an encrypted image is obtained during first-layer encryption.

In C2, the first-layer encrypted predicted value of the encrypted image are obtained during the first-layer encryption.

In C3, a first prediction error value sequence is obtained based on the first-layer encrypted predicted value, and a first prediction error histogram is generated.

In C4, secret information is extracted based on the first prediction error value sequence.

The extraction process is consistent with the extraction process in step 104.

The secret information is extracted within [−2, 1) according to T=1, dw(i, j), and according to equations:

$$S = \mod(dw(i,j)+1, 2) \quad (8); \text{ and}$$

$$Pr(i,j) = (P's(i,j)) + (dw(i,j) - S)/2 \quad (9),$$

where S is an extracted secret information bit, Pr is a restored pixel value, P's is a predicted value of an encrypted image, and dw is a prediction error value of the encrypted image.

The remaining pixels are expanded and translated pixels in a range of [1, +∞) and (−∞, −2), and no information is embedded, and an extraction method is performed according to following equation:

$$\begin{cases} Pr(i, j) = P's(i, j) + dw(i, j) - T & \text{if } dw(i, j) \in [1, +\infty) \\ Pr(i, j) = P's(i, j) + dw(i, j) + T & \text{if } dw(i, j) \in (-\infty, -2) \end{cases} \quad (10)$$

until all of the secret information is extracted completely.

In C5, a losslessly compressed location map is decompressed to obtain a decompressed location map.

In C6, according to the decompressed location map, pixels corresponding to location map mark of 1 are obtained, the pixel is modified and restored, to restore an original pixel value, and obtain a non-destructive restored original image.

Figure 5:
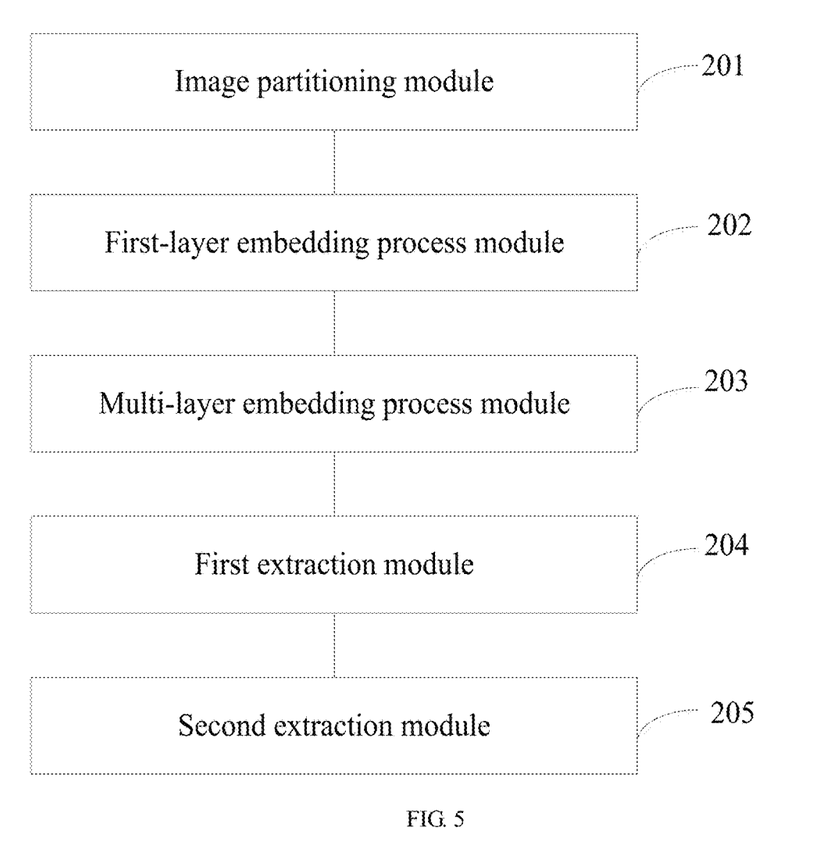
FIG. 5 is a schematic structural diagram of a system for hiding reversible data based on prediction errors.

FIG. 5 is a schematic structural diagram of a system for hiding reversible data based on prediction errors. As shown in FIG. 5, the system includes:
- an image partitioning module 201, configured to partition an image, to obtain a shadow part and a blank part;
- a first-layer embedding process module 202, configured to perform first-layer embedding process on the shadow part;
- a multi-layer embedding process module 203, configured to perform multi-layer embedding process on the blank part;
- a first extraction module 204, configured to extract outermost layer information of the blank part after the multilayer embedding process; and
- a second extraction module 205, configured to extract information of the shadow part after the first-layer embedding process.

Each example of the present specification is described in a progressive manner, each example focuses on the difference from other examples, and the same and similar parts between the examples may refer to each other.

In this specification, several examples are used for illustration of the principles and implementations of the present disclosure. The description of the foregoing examples is used to help illustrate the method of the present disclosure and the core principles thereof. In addition, those of ordinary skills in the art can make various modifications in terms of specific implementations and scope of application in accordance with the teachings of the present disclosure. In conclusion, the content of the present specification shall not be construed as a limitation to the present disclosure.

What is claimed is:

1. A method for hiding reversible data based on prediction errors, comprising:
   partitioning an image, to obtain a shadow part and a blank part;
   performing a first-layer embedding process on the shadow part;
   performing a multi-layer embedding process on the blank part;
   extracting outermost layer information of the blank part after the multilayer embedding process; and
   extracting information of the shadow part after the first-layer embedding process.

2. The method for hiding reversible data based on prediction errors according to claim 1, wherein the partitioning an image comprises:
   scanning the image from left to right and from top to bottom, to obtain an original pixel sequence $\{c_1, c_2, \ldots, c_n\}$ of the image; and partitioning the original pixel sequence, to obtain the blank part $\{a_1, a_2, \ldots, a_n\}$ and the shadow part $\{x_1, x_2, \ldots, x_n\}$.

3. The method for hiding reversible data based on prediction errors according to claim 1, wherein the performing first-layer embedding process on the shadow part comprises:

predicting center pixels by using peripheral pixels of the shadow part, to obtain first-layer encrypted predicted value, wherein a first row, a first column, a last row, and a last column of pixels of the shadow part are not predicted; and following equation is adopted:

$$\hat{x}1 = \text{floor}\left[\frac{a1 + a2 + a3 + a6 + a7 + a9 + a10 + a11}{8}\right] \quad (1)$$

$$\hat{x}2 = \text{floor}\left[\frac{a3 + a4 + a5 + a7 + a8 + a11 + a12 + a13}{8}\right]$$

$$\vdots$$

$$\hat{x}n(i, j) = \text{floor}\left[\frac{a(i-1, j-1) + a(i-1, j) + a(i-1, j+1) + a(i, j-1) + a(i, j+1) + a(i+1, j-1) + a(i+1, j) + a(i+1, j+1)}{8}\right]$$

wherein equation (1) represents that the center pixels are predicted by using the peripheral pixels, i, j respectively represent a row and a column where a current pixel is located, $\{a1, a2, \ldots, an\}$ are all original pixel values in the first-layer embedding process, $\{\hat{x}1, \hat{x}2, \hat{x}3, \ldots, \hat{x}n\}$ is a one-dimensional predicted value sequence, and predicted values are integers;

calculating difference between an original pixel value of the current pixel and corresponding first-layer encrypted predicted value, to obtain a first prediction error value sequence (e1, ..., en), wherein following equation is adopted:

$$ei = Xi - \hat{x}i \quad (2),$$

wherein Xi represents the original pixel value of the current pixel, and $\hat{x}i$ represents the corresponding first-layer encrypted predicted value;

calculating a frequency of each value in the first prediction error value sequence, to generate a first prediction error histogram;

obtaining additional information, which comprises a length of secret information and a size of a compressed location map;

embedding the additional information in a first row of original image pixels;

embedding the secret information $b \in \{0,1\}$ in a predetermined prediction error value range, to obtain expanded and offset prediction error values; and determining a first-layer encrypted image based on the expanded and offset prediction error values, wherein following equation is adopted:

$$X'_i = \hat{x}_i + e'i \quad (4),$$

wherein $X'_i$ represents a pixel value of the first-layer encrypted image, $\hat{x}_i$ represents a predicted value of a pixel of the shadow part, and e'i represents an expanded and offset prediction error.

4. The method for hiding reversible data based on prediction errors according to claim 3, wherein the embedding the additional information in a first row of original image pixels comprises:

adjusting a boundary pixel value of the shadow part, wherein the boundary pixel value is [0, 255];

modifying location map marks corresponding to modified pixels to be 1, and location map marks corresponding to remaining unmodified pixel values to be 0, to obtain a location map matrix formed by 0 and 1;

compressing the location map matrix to obtain a compressed location map; and embedding the compressed location map in the first row of the original image pixels.

5. The method for hiding reversible data based on prediction errors according to claim 3, wherein the embedding the secret information $b \in \{0,1\}$ in a preset prediction error value range, to obtain expanded and offset prediction error values adopts following equation:

$$e'i = \begin{cases} 2ei + b, & \text{if } ei \in [-T, T) \\ ei + T, & \text{if } ei \in [T, +\infty) \\ ei - T, & \text{if } ei \in (-\infty, -T) \end{cases} \quad (3)$$

wherein b represents the secret information, ei represents a prediction error, T represents an prediction error range by which the secret information is embedded, and e'i represents the expanded and offset prediction error.

6. The method for hiding reversible data based on prediction errors according to claim 1, wherein the performing multi-layer embedding process on the blank part comprises:

predicting pixels of the blank part with neighbor pixels as centers by using first-layer encrypted pixels, to obtain second-layer encrypted predicted value;

calculating a difference between an original pixel value of a current pixel and corresponding second-layer encrypted predicted value, to obtain a second prediction error value sequence;

calculating a frequency of each value in the second prediction error value sequence, to generate a second prediction error histogram; and performing data embedding and translation according to the second prediction error histogram, to obtain a final encrypted image.

7. The method for hiding reversible data based on prediction errors according to claim 1, wherein the extracting outermost layer information of the blank part after the multilayer embedding process comprises:

extracting additional information embedded in a first row;

obtaining second-layer encrypted predicted value of pixels of an encrypted image;

obtaining a second prediction error value sequence based on the second-layer encrypted predicted value, and generating a second prediction error histogram;

extracting secret information according to the second prediction error value sequence; and restoring pixel values of an outermost encrypted image.

8. The method for hiding reversible data based on prediction errors according to claim 1, wherein the extracting information about the shadow part after the first-layer embedding process comprises:
- obtaining an encrypted image during first-layer encryption;
- obtaining first-layer encrypted predicted value of the encrypted image during the first-layer encryption;
- obtaining a first prediction error value sequence based on the first-layer encrypted predicted value, and generating a first prediction error histogram;
- extracting secret information based on the first prediction error value sequence;
- decompressing a losslessly compressed location map to obtain a decompressed location map; and
- obtaining, according to the decompressed location map, pixels corresponding to location map marks of 1, modifying and restoring the pixels, to restore original pixel values, and obtaining a non-destructive restored original image.

9. The method for hiding reversible data based on prediction errors according to claim 1, wherein the extracting secret information based on the second prediction error value sequence comprises:
- extracting the secret information within [−2, 1) according to T=1, dw(i, j);
- according to formulas: S=mod(dw(i, j)+1, 2) (5); and $$Pr(i,j) = (P's(i,j)) + (dw(i,j) - S)/2 \quad (6),$$

wherein S is an extracted secret information bit, Pr is a restored pixel value, P's is a predicted value of an encrypted image, and dw is a prediction error value of the encrypted image;

the remaining pixels are expanded and translated pixels in a range of [1, +∞) and (−∞, −2), and no information is embedded, and an extraction method is performed according to following formula:

$$\begin{cases} Pr(i, j) = P's(i, j) + dw(i, j) - T & \text{if } dw(i, j) \in [1, +\infty) \\ Pr(i, j) = P's(i, j) + dw(i, j) + T & \text{if } dw(i, j) \in (-\infty, -2) \end{cases} \quad (7)$$

until all the secret information of the blank part is extracted completely.

10. A system for hiding reversible data based on prediction errors, comprising:
- an image partitioning module, configured to partition an image, to obtain a shadow part and a blank part;
- a first-layer embedding process module, configured to perform first-layer embedding process on the shadow part;
- a multi-layer embedding process module, configured to perform multi-layer embedding process on the blank part;
- a first extraction module, configured to extract outermost layer information of the blank part after the multilayer embedding process; and
- a second extraction module, configured to extract information of the shadow part after the first-layer embedding process.

* * * * *